(12) United States Patent
Tarchala et al.

(10) Patent No.: US 11,573,676 B2
(45) Date of Patent: Feb. 7, 2023

(54) METHOD AND SYSTEM FOR MANAGING CONTEXTUAL VIEWS WITHIN A USER INTERFACE

(71) Applicant: Honda Motor Co., Ltd., Tokyo (JP)

(72) Inventors: Christopher Tarchala, Torrance, CA (US); Hanna Gee, Torrance, CA (US); Jonathan Palmer Neill, Grand Rapids, MI (US); Caitlyn Zhishang Hain, Grand Rapids, MI (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/218,124

(22) Filed: Mar. 30, 2021

(65) Prior Publication Data

US 2022/0317857 A1    Oct. 6, 2022

(51) Int. Cl.
| | | |
|---|---|---|
| *G06F 3/04815* | (2022.01) | |
| *G06F 3/0488* | (2022.01) | |
| *H04W 4/02* | (2018.01) | |
| *G06T 19/20* | (2011.01) | |
| *G06T 13/20* | (2011.01) | |
| *G06T 19/00* | (2011.01) | |

(52) U.S. Cl.
CPC ........ *G06F 3/04815* (2013.01); *G06F 3/0488* (2013.01); *G06T 13/20* (2013.01); *G06T 19/003* (2013.01); *G06T 19/20* (2013.01); *H04W 4/025* (2013.01)

(58) Field of Classification Search
CPC .............. G06F 3/04815; G06F 3/0488; G06F 3/04883; G06T 13/20; G06T 19/003; G06T 19/20; H04W 4/025; B60K 35/00; B60K 2370/569
See application file for complete search history.

(56) References Cited

U.S. PATENT DOCUMENTS

| | | | |
|---|---|---|---|
| 9,285,955 B2 * | 3/2016 | Nezu ..................... | B60K 35/00 |
| 9,346,358 B2 | 5/2016 | Kinoshita et al. | |
| | | (Continued) | |

FOREIGN PATENT DOCUMENTS

| | | |
|---|---|---|
| CN | 107172288 A | 9/2017 |
| CN | 109587324 A | 4/2019 |
| | (Continued) | |

OTHER PUBLICATIONS

Eddy Joe, "Tesla Model S (2017): Infotainment Screen Tour and Review", (Nov. 3, 2017), <URL: https://www.youtube.com/watch?v=dEv9TzWfD8o/>, p. 1-14 (Year: 2017).*

(Continued)

*Primary Examiner* — Mong-Shune Chung
(74) *Attorney, Agent, or Firm* — Plumsea Law Group, LLC

(57) ABSTRACT

A method and system for managing contextual views within an application interface are disclosed. The method includes displaying a first view within an application interface that provides information about a user selected vehicle. The method also includes displaying a second view within an application interface that provides information about an environment. The second view may present an interactive (Continued)

three-dimensional model that provides an immersive experience. The application may switch between the first view and the second view according to user input.

20 Claims, 11 Drawing Sheets

(56) References Cited

U.S. PATENT DOCUMENTS

| | | | |
|---|---|---|---|
| 10,460,529 | B2 | 10/2019 | Dascola et al. |
| 10,740,972 | B2 | 8/2020 | Thompson |
| 2011/0137758 | A1* | 6/2011 | Bienias .............. G06Q 30/0621 705/27.2 |
| 2011/0309924 | A1* | 12/2011 | Dybalski .................. G06F 9/44 340/438 |
| 2014/0350784 | A1* | 11/2014 | Imai ...................... G06F 3/0393 701/36 |
| 2015/0321558 | A1* | 11/2015 | Solomon ................ B60K 37/06 701/526 |
| 2016/0154578 | A1 | 6/2016 | Luo et al. |
| 2017/0060358 | A1* | 3/2017 | Hirano .................. G06F 3/0485 |
| 2017/0103584 | A1* | 4/2017 | Vats ........................ G06T 19/20 |
| 2017/0212646 | A1 | 7/2017 | Rao et al. |
| 2017/0308268 | A1* | 10/2017 | Chiba .................. G06F 3/04817 |
| 2018/0210442 | A1 | 7/2018 | Guo et al. |
| 2019/0348012 | A1 | 11/2019 | Pirtle |

FOREIGN PATENT DOCUMENTS

| | | |
|---|---|---|
| CN | 111158832 A | 5/2020 |
| CN | 211349651 U | 8/2020 |
| CN | 109537950 B | 10/2020 |
| CN | 111917160 A | 11/2020 |
| EP | 3101392 A1 | 12/2016 |
| KR | 101669167 B1 | 10/2016 |
| KR | 20200122210 A | 10/2020 |
| WO | 2012054539 A2 | 4/2012 |
| WO | 2014059485 A1 | 4/2014 |

OTHER PUBLICATIONS

Zachary Shahan, "Tesla Autopilot Display Will Soon Show Other Teslas By Model & Color", (Jul. 30, 2020), <URL: https://cleantechnica.com/2020/07/30/tesla-autopilot-display-will-soon-show-other-teslas-by-model-color/>, p. 1-5 (Year: 2020).*

Elementals Studio, "Car 3d Configurator AR\VR", (Sep. 8, 2017), <URL: https://www.youtube.com/watch?v=_oYhrZ3ssH0/>, p. 1-4 (Year: 2017).*

Hirudov2d, "Sony PlayStation 2 PS2—Boot and Start Menu—Composite cable", (Jul. 5, 2020), <URL: https://www.youtube.com/watch?v=53oEot_fZ08/>, p. 1-8 (Year: 2020).*

* cited by examiner

METHOD AND SYSTEM FOR MANAGING CONTEXTUAL VIEWS WITHIN A USER INTERFACE

BACKGROUND

The embodiments relate generally to methods and systems for managing contextual views within a user interface.

User interfaces can be utilized to display a wide variety of information for users. In the context of motor vehicles, user interfaces may be used to display vehicle controls, navigation information, and audio settings. However, existing UI interfaces for motor vehicles and related sales platforms can become cluttered with too much information. Furthermore, information may not be well organized, leading to confusion about where to find particular kinds of information within a given application.

There is a need in the art for a system and method that addresses the shortcomings discussed above.

SUMMARY

Embodiments provide methods and systems for managing contextual views for a user interface.

In one aspect, a method of modifying views presented within a user interface of an application in response to user behavior includes a step of receiving, via the application, a first user input corresponding to a user selected motor vehicle. The method also includes a step of displaying a first view, the first view comprising a background graphical element and a vehicle information element disposed in front of the background graphical element, where the vehicle information element provides information about a current state of the user selected vehicle. The method also includes steps of automatically retrieving a user location, and receiving, via the application, a second user input. The method also includes a step of automatically replacing, in response to receiving the second user input, the first view with a second view, the second view presenting an interactive three-dimensional model corresponding to the user location.

In another aspect, a method of modifying views presented in a user interface of an application in response to user behavior includes a step of receiving, via the application, a first user input corresponding to a user selected motor vehicle. The method also includes a step of displaying a first view, the first view comprising a background graphical element and a vehicle information element disposed in front of the background graphical element, where the vehicle information element provides information about a current state of the user selected vehicle. The method also includes receiving, via the application, a second user input. The method also includes a step of automatically replacing, in response to receiving the second user input, the first view with a second view. The second view includes a three-dimensional model of an environment, a graphical image representing the user selected vehicle, and a set of selectable vehicle accessories disposed within the three-dimensional model.

In another aspect, a system for modifying views presented within a user interface of an application in response to user behavior includes a processor and machine-readable media including instructions. The instructions, when executed by the processor, cause the processor to receive, via the application, a first user input corresponding to a user selected motor vehicle. The instructions further cause the processor to display a first view, the first view comprising a background graphical element and a vehicle information element disposed in front of the background graphical element, where the vehicle information element provides information about a current state of the user selected vehicle. The instructions further cause the processor to automatically retrieve a user location and receive, via the application, a second user input. The instructions further cause the processor to automatically replace, in response to the received second user input, the first view with a second view, where the second view presents an interactive three-dimensional model corresponding to the user location.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

DETAILED DESCRIPTION

Figure 1:
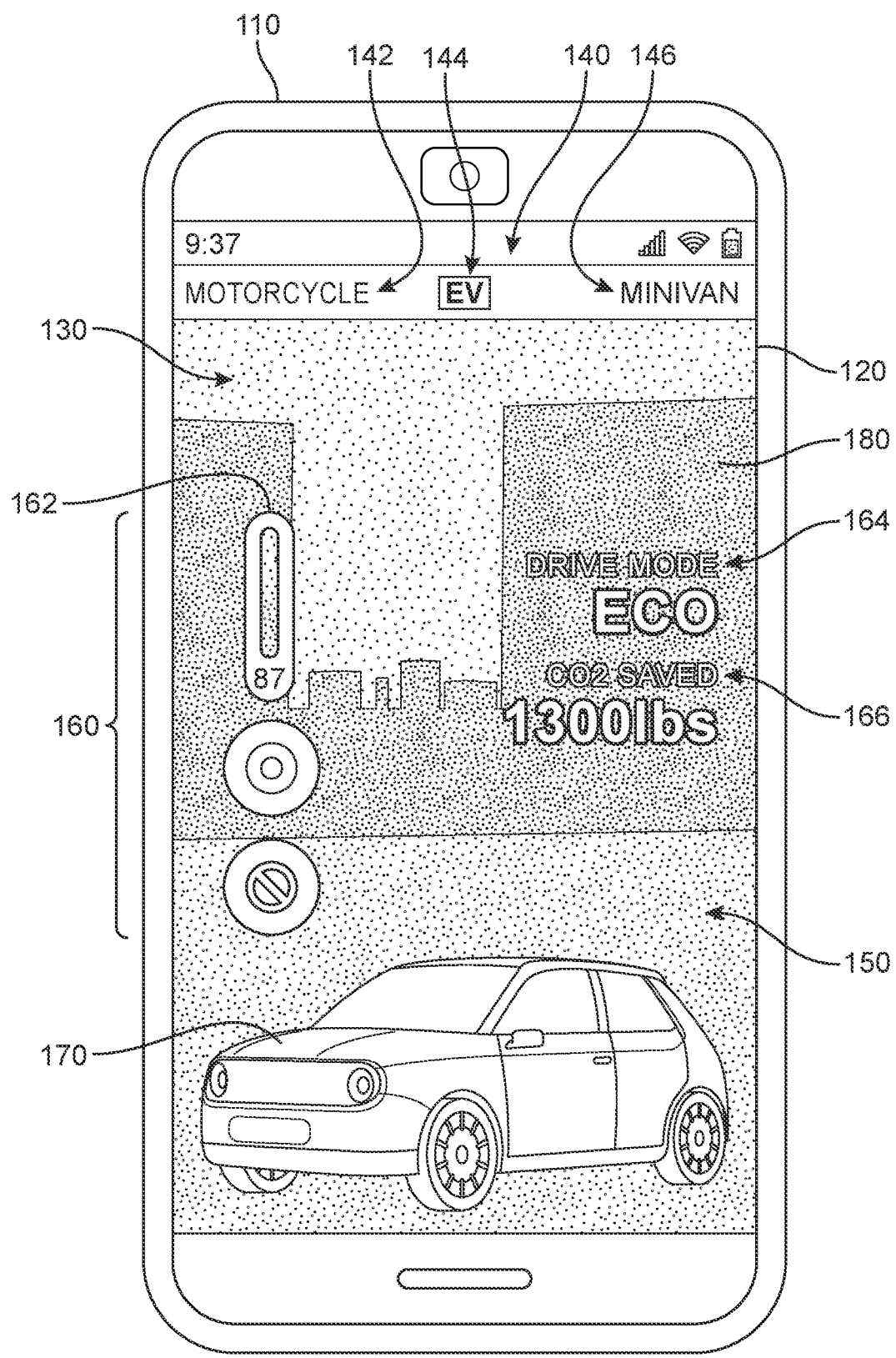
FIG. 1 is a schematic view of a mobile device running an application, according to an embodiment.

Embodiments provide methods and systems for managing contextual views for a user interface. More specifically, the methods and systems provide an application that can be run on a computing device. The application provides a digital experience for a user of a motor vehicle. Within the application, the user can seamlessly transition between a simplified view including information about a particular vehicle, and a three-dimensional immersive view including information about the user's environment.

Throughout this disclosure, references to components or modules generally refer to items that logically can be grouped together to perform a function or group of related functions. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems such as client-server distributed systems, and can use other protocols, or operate at other layers in communication protocol stacks, than are described.

Throughout this application, an "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" or "triggering event" refers to an event (or specific sequence of events) associated with a particular input or use of an application via an interface, which can trigger a change in the display of the application. Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. As some non-limiting examples, an asset may include text in an actuatable pop-up window, audio associated with the interactive click of a button or other native application object, video associated with a teaching user interface, or other such information presentation.

Furthermore, graphical user interfaces (GUIs) can be used to present information to a user in the form of icons, graphics, or other types of interactive elements. Such interactive elements are generally associated with a particular action or command. A user typically has to supply an input to a computing system that is associated with the interactive elements presented on the graphical user interface to execute the particular action or command. As used herein, "interactive element" broadly includes a wide variety of graphical tools or components, such as graphical icons, graphical menus, graphical buttons, hyperlinks, images, and any other element which can be displayed on a graphical display and associated with or otherwise linked to an action or process that is to be performed upon activation of an interactive element. In some contexts, the term "information element" is used to describe a UI element that is specifically intended to provide a user with relevant information, as opposed to providing a particular aesthetic or design choice. Information elements may be interactive or non-interactive, and may comprise any suitable type of UI element.

For clarity, the components of a user interface may be understood as comprising one or more views. As used here, a "view" is a collection of graphical elements, interactive elements, and any other UI elements displayed via the user interface. An application may switch between two or more different views in response to a triggering event, such as a user gesture, or a command from another module, component, or process. The terms "switching," "swapping," and "replacing," may be used interchangeably to refer to the act of removing one view from the user interface and displaying another view within the same user interface.

Graphical elements and other UI elements may be understood as existing in different layers within a user interface view. The relative position of a layer may be characterized as being "in front of" or "behind" another layer. As used herein, a first graphical element is disposed "in front of" a second graphical element if the first graphical element appears to be superimposed on the second graphical element such that the first graphical element obscures part of the second graphical element when the two elements occupy the same region on a display. Likewise, a first graphical element is disposed "behind" a second graphical element if the second graphical element appears to be superimposed over the first graphical element.

For purposes of introduction, an overview of one embodiment of the proposed systems and methods is illustrated with reference to FIGS. 1-3. FIG. 1 is a schematic view of a computing device 110 in the form of a smartphone. In other embodiments, computing device 110 could be a tablet, laptop, desktop, or another type of computing device. Computing device 110 includes a display 120 (in this case, a touchscreen display) that provides a viewing and interactive mechanism for the user. Display 120 presents an application ("app") 130, which allows a user to switch between different contextual views.

In the embodiment of FIG. 1, app 130 displays a first view 150. First view 150 is comprised of multiple graphical elements, which may be further configured into multiple layers. These include a set of information elements 160, such as temperature indicator 162, drive mode indicator 164, and carbon savings indicator 166. First view 150 may also comprise a selected vehicle element 170, which comprises an image of a particular vehicle owned by a user of app 130.

First view 150 also comprises a background graphical element ("background element") 180. In the exemplary embodiment, background element 180 comprises an image of a cityscape that includes several buildings. In some embodiments, the image could be a static image that remains fixed as long as first view 150 is displayed. In other embodiments, the image could be a dynamic image. In some cases, a dynamic image could comprise an animation that repeatedly plays in the background. In other cases, a dynamic image could be constructed from a live view that may be captured by a camera of the mobile device, for example.

In some embodiments, first view 150 may also include various interactive elements that allow a user to control one or more vehicle systems, such as climate control systems, audio systems, and navigation systems. In other words, first view 150 may include both passive information elements that display a state of a vehicle system, as well as active elements that facilitate basic controls for one or more systems.

First view 150 may be configured according to the type of motor vehicle selected from a vehicle selection menu 140. Vehicle selection menu 140 may include a list of vehicles owned by a user. For example, in the exemplary embodiment, a first selectable vehicle 142 comprises a motorcycle, a second selectable vehicle 144 comprises an electric vehicle (EV) and a third selectable vehicle 146 comprises minivan. In some cases, these different vehicles may all be sold by the same manufacturer.

In the embodiment of FIG. 1, a user has selected second selectable vehicle 144, which is an electric vehicle. Based on this selection, app 130 automatically determines the types of information to display within first view 150. For example, because the user has selected an electric vehicle, app 130 displays information that is particularly relevant to this type of vehicle, namely the driving mode and a carbon emissions savings.

Furthermore, based on the particular vehicle selected, app 130 uses a cityscape for background element 180. If the user were to instead select another kind of vehicle, the various UI elements could be changed accordingly. Specifically, the image of the user selected vehicle would be changed. Also, in some cases, the information elements that are displayed could be changed according to the type of vehicle. For example, if a minivan is selected, the information elements could display miles logged on a given trip. In some cases, the background image could also be changed according to the type of vehicle selected. As an example, if a boat or other watercraft is selected, the background image could feature a shoreline instead of a cityscape.

In the embodiments, a user can opt to change the context of the information available via app 130. For example, in some situations, a user may want to explore the environment of their current location. The simplified interface displayed within first view 150 may be insufficient to show detailed information about the environment.

Figure 2:
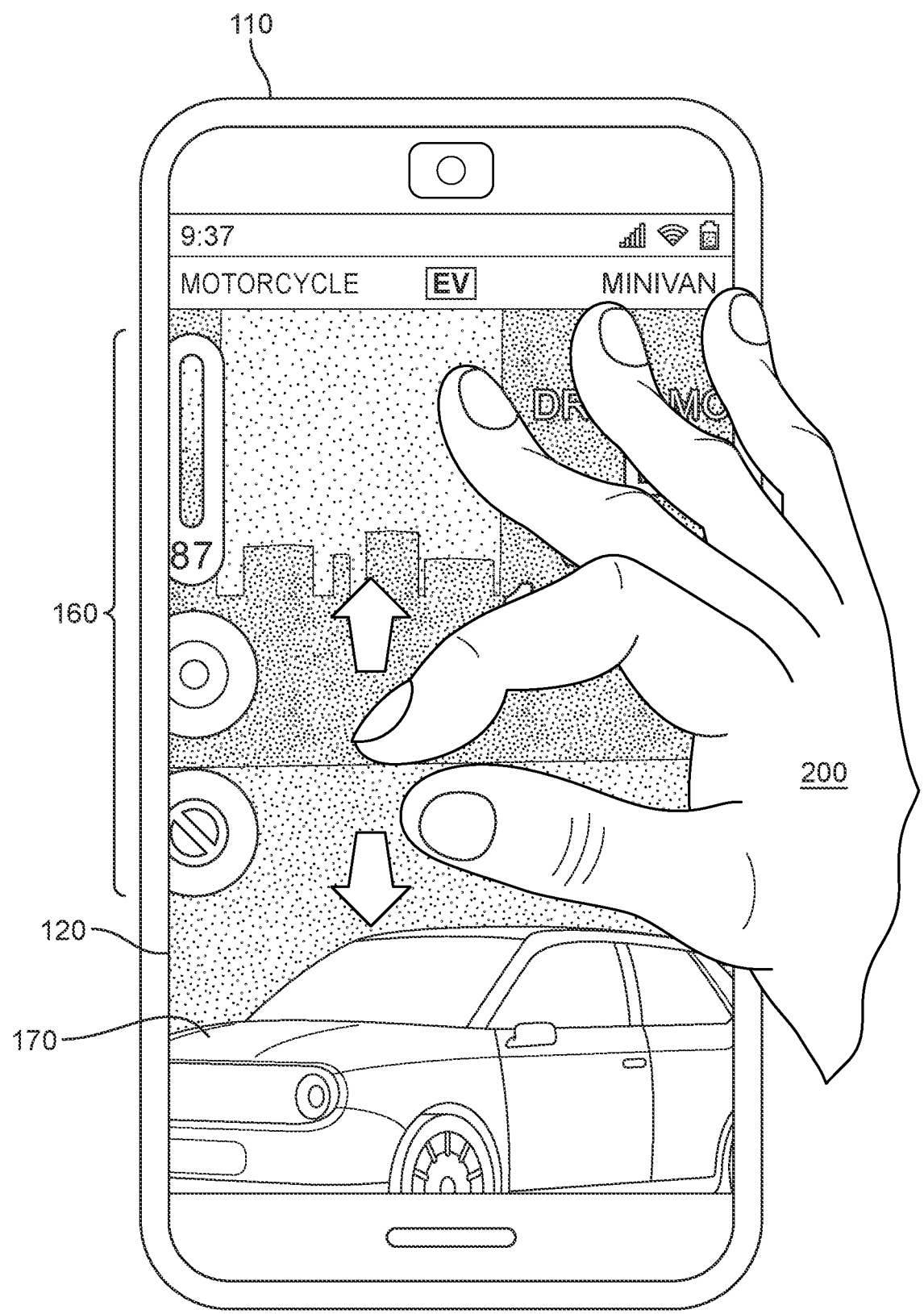
FIG. 2 is a schematic view of a user interacting with an application using a gesture-based control, according to an embodiment.
Figure 3:
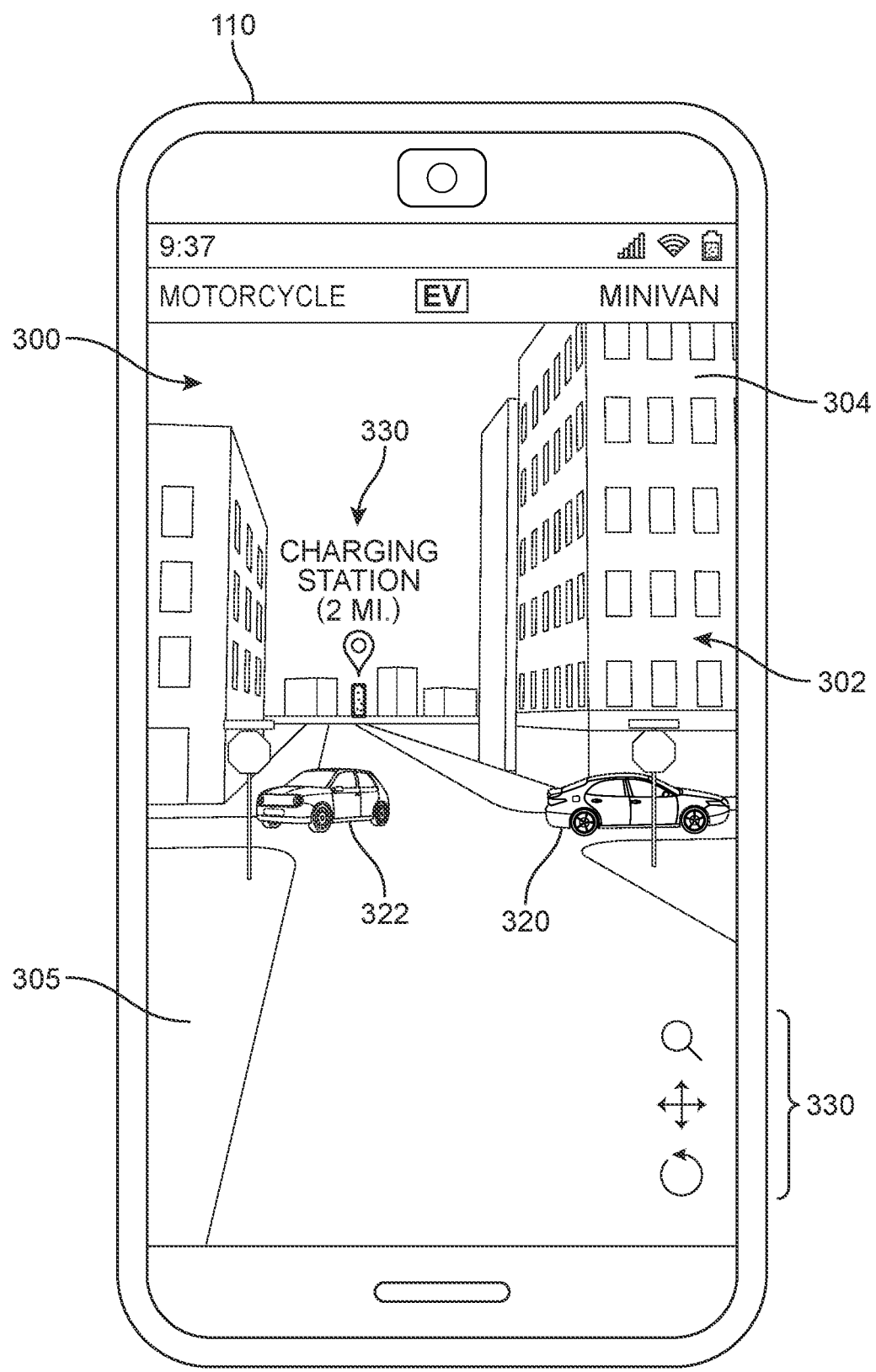
FIG. 3 is a schematic view of an application displaying an interactive three-dimensional model of an environment, according to an embodiment.

As shown in FIGS. 2-3, the embodiments provide a way for the user to change contexts via a gesture-based control. Specifically, as shown in FIG. 2, a user 200 may perform a "zooming-in" gesture by pressing two fingers against display 120 and dragging the fingers apart. In some cases, this may generate a transition effect that zooms in past the foreground elements (such as selected vehicle 170 and information elements 160) and "through" the background image. After passing through the background image, the application displays a second view 300, as shown in FIG. 3.

Second view 300 comprises an immersive view of the environment where the user is currently located. More specifically, second view 300 displays an interactive three-dimensional model ("model") 302 of the real-world environment. Model 302 includes three-dimensional buildings 304 embedded in a three-dimensional city landscape 305.

A user may explore model 302 using any suitable controls. In some cases, the user could navigate model 302 using touch-based gestures such as tapping, swiping, and pinching in and out. In other cases, the user could navigate model 302 using a set of navigation controls 310. Navigation controls 310 could include, for example, zoom controls, pan controls, and rotate controls. Using suitable controls, a user could navigate along roadways and explore various locations such as buildings, parks, or other points of interest.

In some embodiments, app 130 may generate graphical elements that may be superimposed onto model 302. For example, app 130 could generate an avatar of a vehicle 320 that has been detected near the user in their environment. In embodiments where app 130 can retrieve a precise location for that vehicle, app 130 could translate the vehicle's real-world location into a corresponding location within model 302.

In some embodiments, app 130 could generate special avatars for any vehicles in the user's real-world environment that match the user-selected vehicle. For example, in the exemplary embodiment a user has previously indicated they are driving an electric vehicle of a particular make and model. In response to this user input, along with detecting the presence of another electric vehicle of the same make and model, app 130 may generate a corresponding avatar 322 that is displayed within second view 300 and superimposed onto model 302. This allows users to easily identify other users with similar vehicles. In some cases, in order to make it easier for a user to identify vehicles similar to their own, those vehicle avatars may be accentuated using visual effects such as highlighting, distinctive coloring, or any other suitable effects.

App 130 may generate other information elements related to points of interest specific to the user selected vehicle. For example, in the embodiment shown in FIG. 3, second view 300 includes information elements 330 that indicate a point of interest for the user. Specifically, information elements 330 indicate to the user that there is a charging station for their electric vehicle located 2 miles ahead. In another situation where a user has selected a non-electric minivan, app 130 may display different information elements, such as the location of a gas station.

It may be appreciated that the examples shown in FIG. 3 and described above are only intended to be exemplary. In other embodiments, app 130 could generate any suitable graphical elements, information elements, avatars, or other UI elements that provide useful information to a user given their current location and the user selected vehicle.

For purposes of illustration, elements of three-dimensional model 302 are shown schematically with minimal visual detail. However, it may be appreciated that a three-dimensional model 302 could be configured with any desired level of detail that can be handled by application 130 and supporting software and hardware components. Moreover, in some embodiments, the visual appearance of three-dimensional model 302 could be developed according to a particular aesthetic or other design principles. In one embodiment, for example, objects such as buildings and vehicles could be displayed with relatively rounded corners, and softer edges to provide a coherent aesthetic experience for a user as they move through different parts of the three-dimensional model environment.

Information related to points of interest can be retrieved from any suitable data sources, including any suitable navigation systems and/or other suitable geographic information systems. Information related to nearby vehicles could be retrieved using any suitable methods. In some cases, vehicle information could be retrieved from neighboring vehicles using a vehicle-to-vehicle communications network. In other cases, vehicle information could be retrieved from applications that share user data.

It may be appreciated that the process of "zooming in" from a vehicle focused first view to an environment focused second view could be reversible. That is, in some cases, a user could switch from the second view back to the first view using suitable gestures or other controls. For example, in one embodiment, a user could using use a pinching gesture to "zoom out" from the three-dimensional model environment and return to the first view which displays high level information about the vehicle and ambient conditions.

The embodiments shown in FIGS. 1-3 and described above illustrate how an application can switch between two different contextual views. Specifically, in the exemplary embodiments, first view 150 provides information related to the operating state of the vehicle (such as driving mode), as well as easily quantifiable information about the ambient environment (such as the current temperature). Moreover, details of the user's environment are abstracted behind the vehicle specific information, in the form of either a static background image suitable to the user selected vehicle, or a dynamic background image with minimal detail. By contrast, in the exemplary embodiments, second view 300 provides an immersive view of the environment in which a user can explore various points of interest as well as observe other users with similar vehicles in the environment.

Moreover, both first view 150 and second view 300 depend on the user selected vehicle. That is, kinds of information displayed, visual styles, and specific graphical elements used may change according to the type of vehicle. This allows both the first view and the second view to focus on information that is particularly useful for the user selected vehicle and ignore less relevant information that might otherwise clutter the views.

Figure 4:
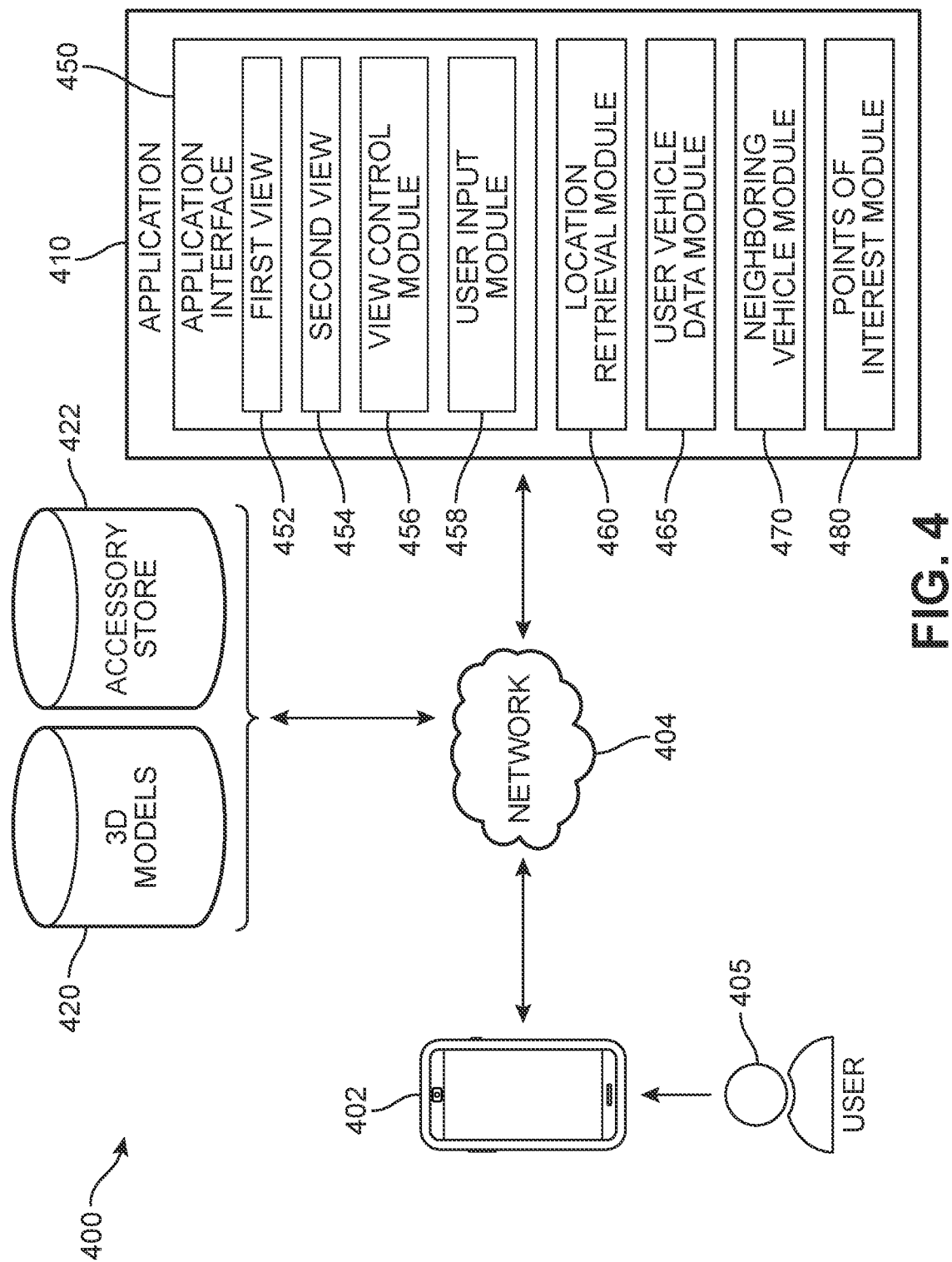
FIG. 4 is a schematic view of an application environment, according to an embodiment.

In order to provide the reader with a greater appreciation of the embodiments, FIG. 4 depicts a schematic overview of an embodiment of a test drive scheduling application environment ("environment") 400. FIG. 4 is shown for the purposes of illustrating one or more exemplary embodiments and not for purposes of limiting the same. The components of the environment 400, including application system ("app" or "application") 410, as well as the components of other systems, hardware architectures, and software architectures discussed herein, may be combined, omitted, or organized into different architectures for various embodiments.

In FIG. 4, the environment 400 includes a computing device 402 that communicates over a network 404 to application 410. For purposes of illustration, a user 405 accesses the front-end user interface of the application provided by the application 410 via computing device 402. The computing device 402 may include provisions for communicating with the application 410. In some embodiments, the communication may occur over network 404. Generally, network 404 may be any type of network, including, but not limited to Wi-Fi networks, cell phone networks, as well as any other type of network. Furthermore, network 404 may be associated with any type of network standard including, but not limited to CDMA, TDMA, GSM, AMPS, PCS, analog and/or W-CDMA.

Components of application 410 may be in communication with backend systems. For example, as shown in FIG. 4, components of application 410 can communicate with a 3D model database 420 and an accessory store 422. For purposes of clarity FIG. 4 shows just two possible backend systems from which application 410 may retrieve data, however it may be appreciated that in other embodiments application 410 could communicate with any number of inventory and scheduling systems.

In some embodiments, application 410 may be hosted on a cloud-based server that may include a plurality of interconnected servers (not shown), including but not limited to web servers, data servers, database servers, domain controllers, backup servers, and the like. The host device or devices may include suitable processors and memory for running application 410.

Figure 6:
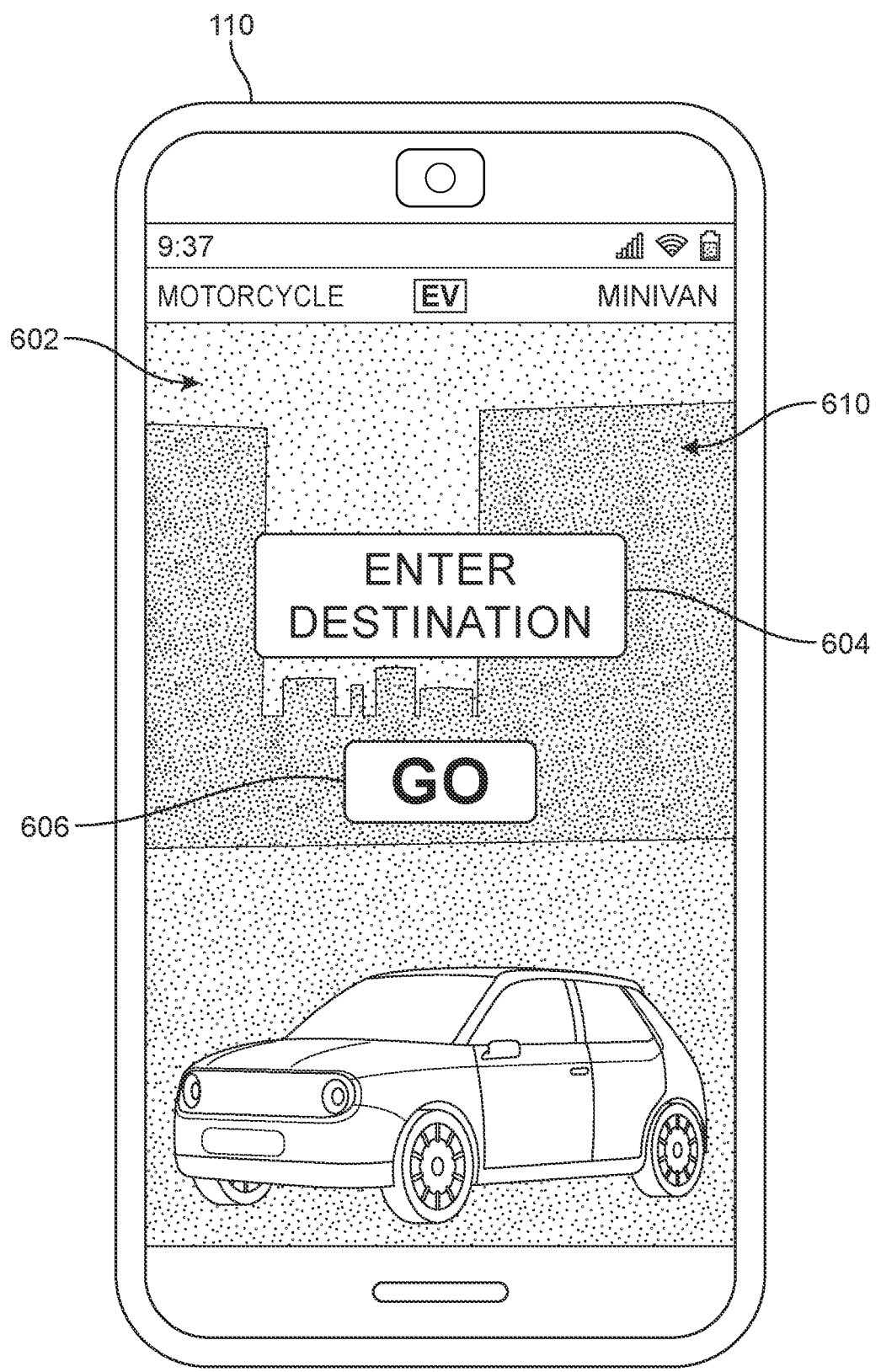
FIGS. 6-7 are schematic views of an application within the context of navigation, according to an embodiment.
Figure 7:
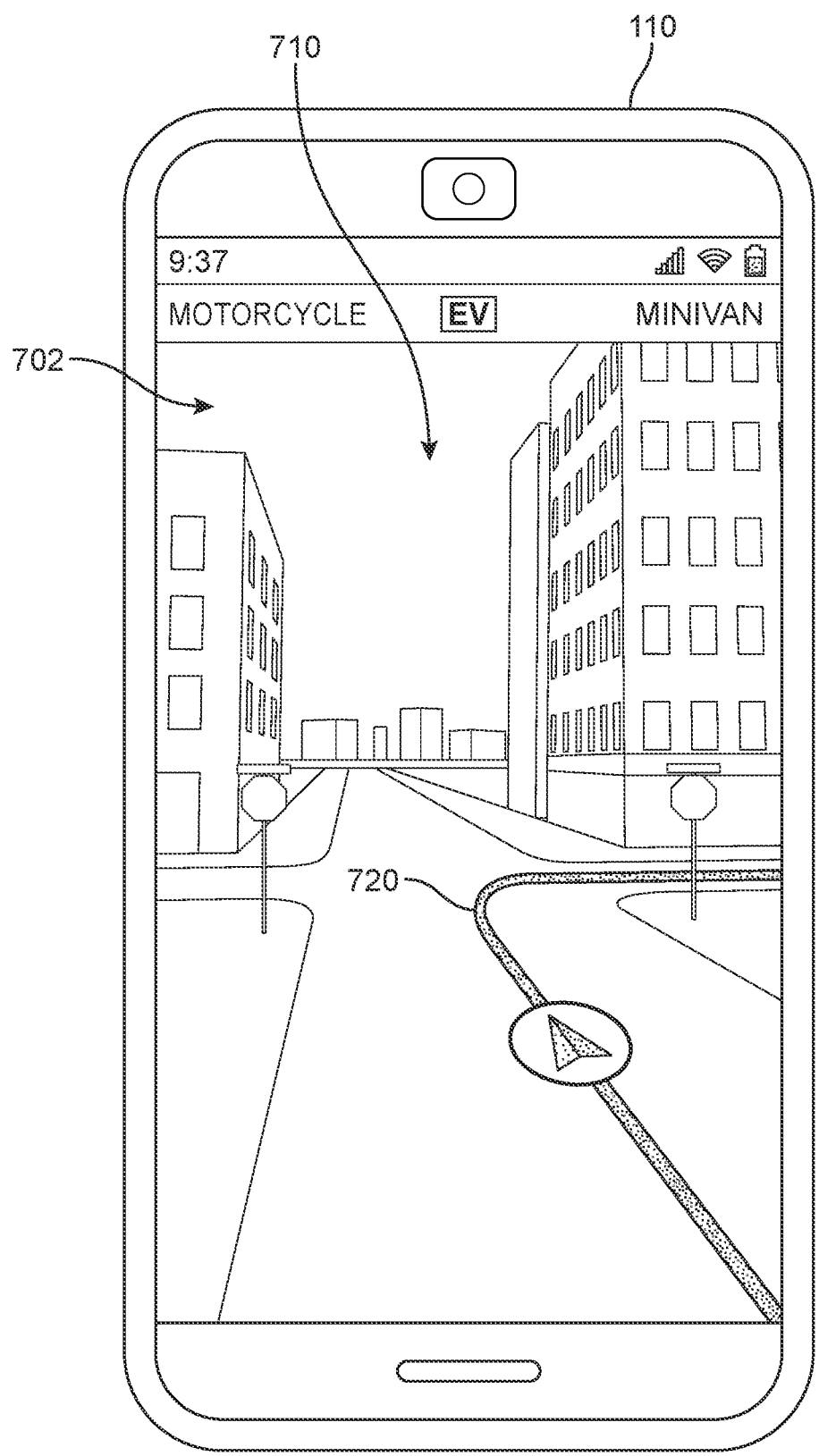

Application 410 may further include a plurality of modules that provide a plurality of functions. In different embodiments, application 410 includes an application interface module 450 which is configured to present various graphical elements and components that may be organized into various views. Application interface module 450 may further include a first view 452, a second view 454, and a view control module 456. In one embodiment, first view 452 comprises graphical elements providing contextual information related to the user selected vehicle itself, while second view 454 includes graphical elements providing contextual information related to an immersive three-dimensional environment. View control module 456 may be configured to switch between first view 452 and second view 454 in response to various triggering actions. For example, view control module 456 could switch between first view 452 and second view 454 in response to a user gesture (as shown in FIG. 2). As another example, view control module 456 could switch between first view 452 and second view 454 in response to another triggering action, such as displaying a navigation route for a user (as shown in FIGS. 6-7).

Application interface 410 may also include a user input module 458 that is responsible for controlling input elements used to receive user information. User input module 458 may also be configured to store user input, such as a user selected vehicle, locally so that other modules can retrieve the user input data.

Application 410 may also include various other modules such as a location retrieval module 460 that is configured to retrieve a current user location. In some cases, this information can be obtained by querying a user's mobile device, such as computing device 402, which may be equipped with GPS.

Application 410 may also include a user vehicle data module 465 that is configured to retrieve and store data about the user's vehicle. Exemplary kinds of information that could be retrieved and stored include information about the current state of the vehicle, historical data related to the vehicle, and/or ambient data about the vehicle's interior or external environment. Examples of various kinds of vehicle data include the vehicle driving mode, ambient temperature, carbon emission savings, as well as any other suitable information.

Application 410 may further include a neighboring vehicle module 470 for detecting the presence of neighboring vehicles and identifying vehicles of a similar type to the user selected vehicle. Neighboring vehicle module 470 may identify neighboring vehicles using any suitable sources of information, including vehicle to vehicle communications. Information could also be obtained via commonly used applications that receive and share user and vehicular data.

Application 410 may include a points of interest module 480 for identifying points of interest within an immersive three-dimensional environment. In some cases, points of interest module 480 could determine relevant locations, such as refueling stations, stores, restaurants, dealerships, or other suitable points of interest according to both the user's current location as well as the current user selected vehicle.

Figure 5:
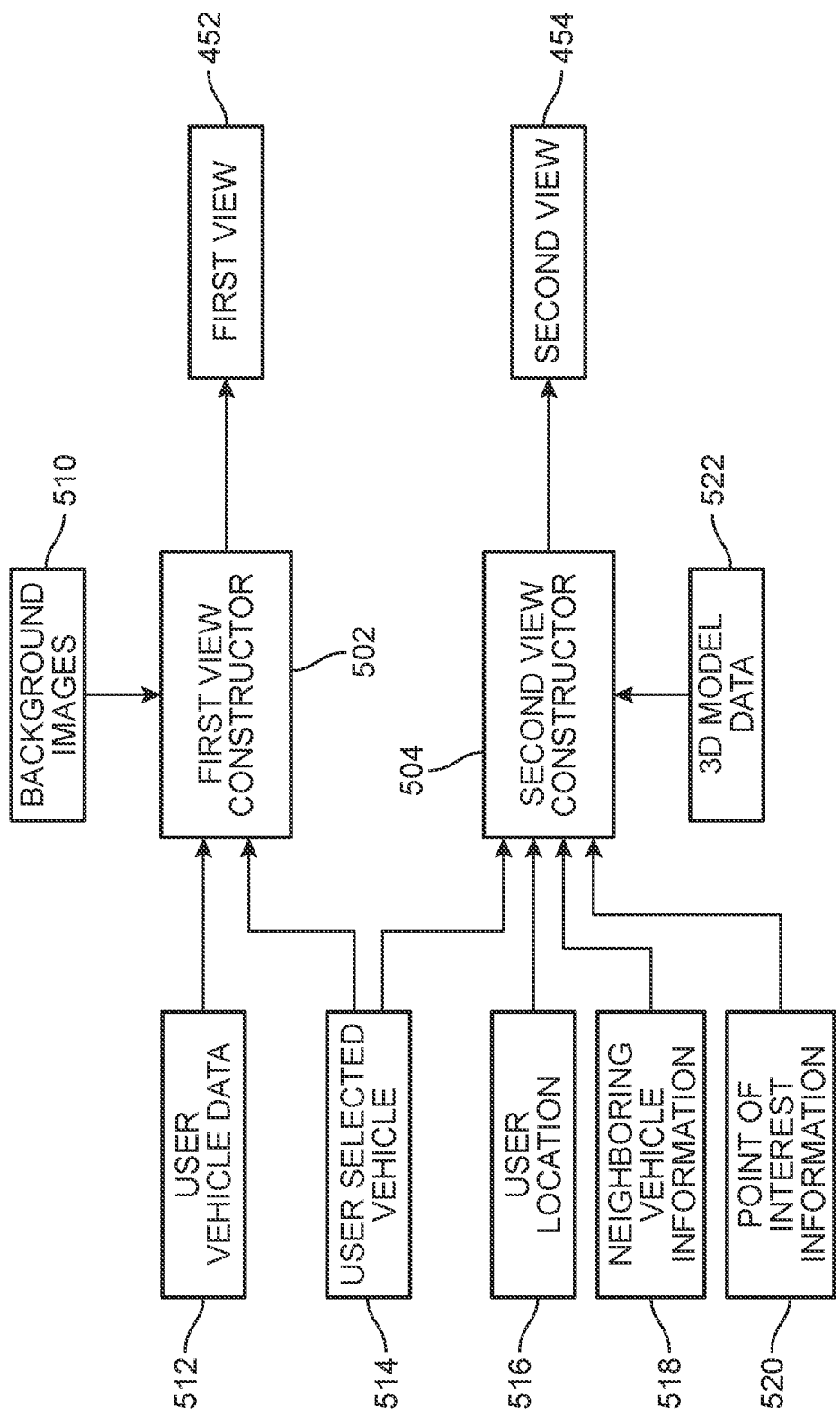
FIG. 5 is a schematic illustration of constructors for building views for an application interface, according to an embodiment.

FIG. 5 is a schematic view showing how various kinds of data associated with the environment of FIG. 4 can be used to construct first view 452 and second view 454. For purposes of clarity, the embodiments describe using a view constructor to build each view. It may be appreciated that a view constructor represents an abstraction for a process of creating and instantiating views within a particular user interface environment. In this example, a first view constructor 502 receives various inputs that are used to construct first view 452. Specifically, first view constructor 502 may receive background images 510, user vehicle data 512, and user selected vehicle 514. This data may be used to construct first view 452, which may present vehicle data and general information related to the user selected vehicle.

A second view constructor 504 may receive various inputs that are used to construct second view 454. Specifically, second view constructor 504 may receive user selected vehicle 514, user location 516, neighboring vehicle information 518, and point of interest information 520. In addition, second view constructor 504 may receive 3D model data 522 for a selected environment, such as the user's current location or another predetermined environment. This data may be used to construct second view 454, which may present detailed information about the environment via an immersive three-dimensional experience.

Of course, the embodiment of FIG. 5 is only intended as an example, and in other embodiments, the first and second views can be constructed using other suitable combinations of inputs. For example, if the background image of a first view is a live view from the user's immediate surroundings, the first view constructor could take the user's location as input. Additionally, the first view constructor could take input from a camera on a user's mobile device to use as part of the background image.

FIGS. 6-7 illustrate schematic views of a configuration where an application may switch between two views in response to receiving a request for a navigation route. As seen in FIG. 6, a first view 602 provides an input field 604 where a user can enter a destination. First view 602 also includes a button 606 to begin the navigation route for the selected destination. As seen in FIG. 6, a simple background image 610 is visible behind the navigational UI components (input field 604 and button 606).

When the user presses button 606, this may trigger the application to switch from first view 602 to a second view 702 shown in FIG. 7. Second view 702 is similar in some respects to second view 300 shown in FIG. 3. However, in this example, a navigation route 720 beginning at the present location is displayed within the context of the immersive three-dimensional model environment 710. For clarity, no points of interest are shown in second view 702, however it may be appreciated that the application could display any relevant points of interest as the user travels along route 720.

The uses of the exemplary systems are not limited to navigational purposes. In another embodiment, shown in FIGS. 8-9, an application could switch between a first view and a second view in order to facilitate an immersive virtual shopping experience.

Figure 8:
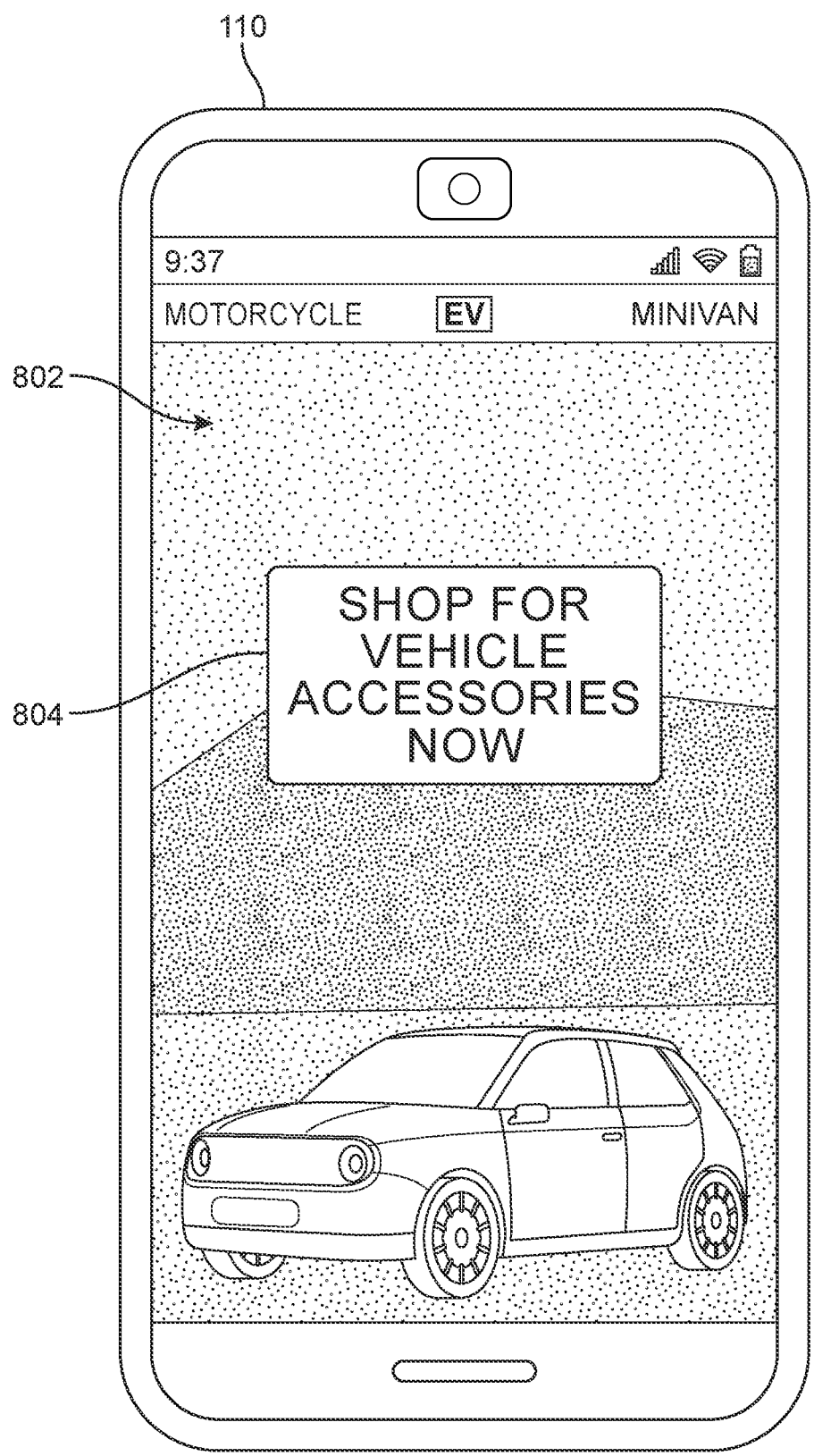
FIGS. 8-9 are schematic views of an application within the context of a virtual store, according to an embodiment.
Figure 9:
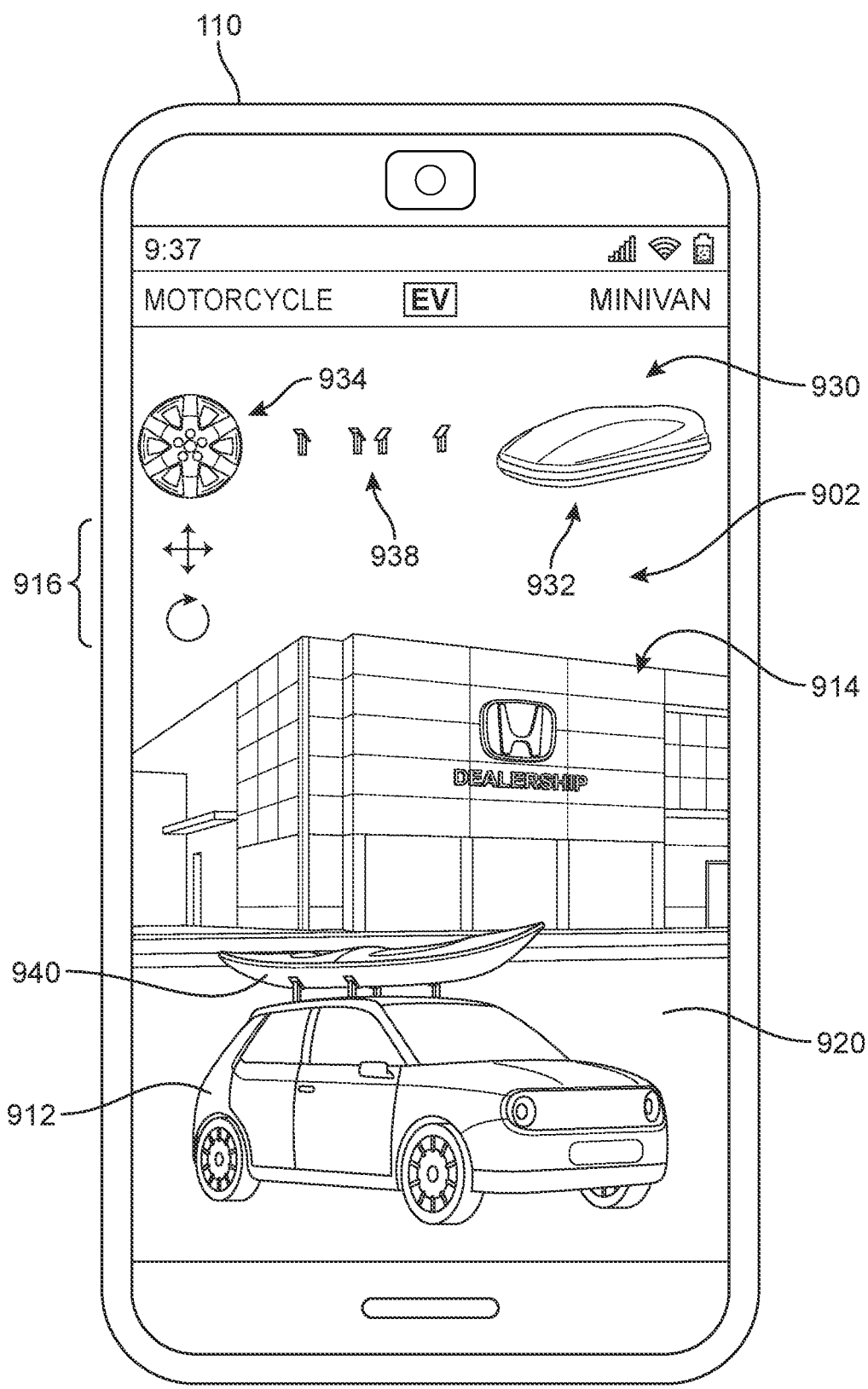

In FIG. 8, an application may display a first view 802, which includes a prompt for a user to shop for vehicle accessories (prompt 804). By using a suitable gesture, a user may zoom into second view 902, which is shown in FIG. 9. In this example, second view 902 displays the user selected vehicle 912 placed within a three-dimensional model 914 of a car dealership. Specifically, user selected vehicle 912 is located in a front parking lot 920 of a car dealership 922. As with previous embodiments, a user can interact with three-dimensional model 914 using touch-based gestures or navigation controls 916.

As seen in FIG. 9, a set of selectable accessories 930 are shown floating within the three-dimensional environment around user selected vehicle 912. Set of accessories 930 may include a roof top carrier 932, a wheel 934, and roof rack system 938. This configuration allows a user to browse accessories for user selected vehicle 912 within the context of an immersive environment that is best suited to simulating a shopping experience. In this example, a user has selected roof rack system 938, which is displayed on the roof of vehicle 912 along with a boat 940 to show an exemplary use of roof rack system 938. As the user selects different accessories, the view may be updated to display how the accessory would appear on the vehicle.

Figure 10:
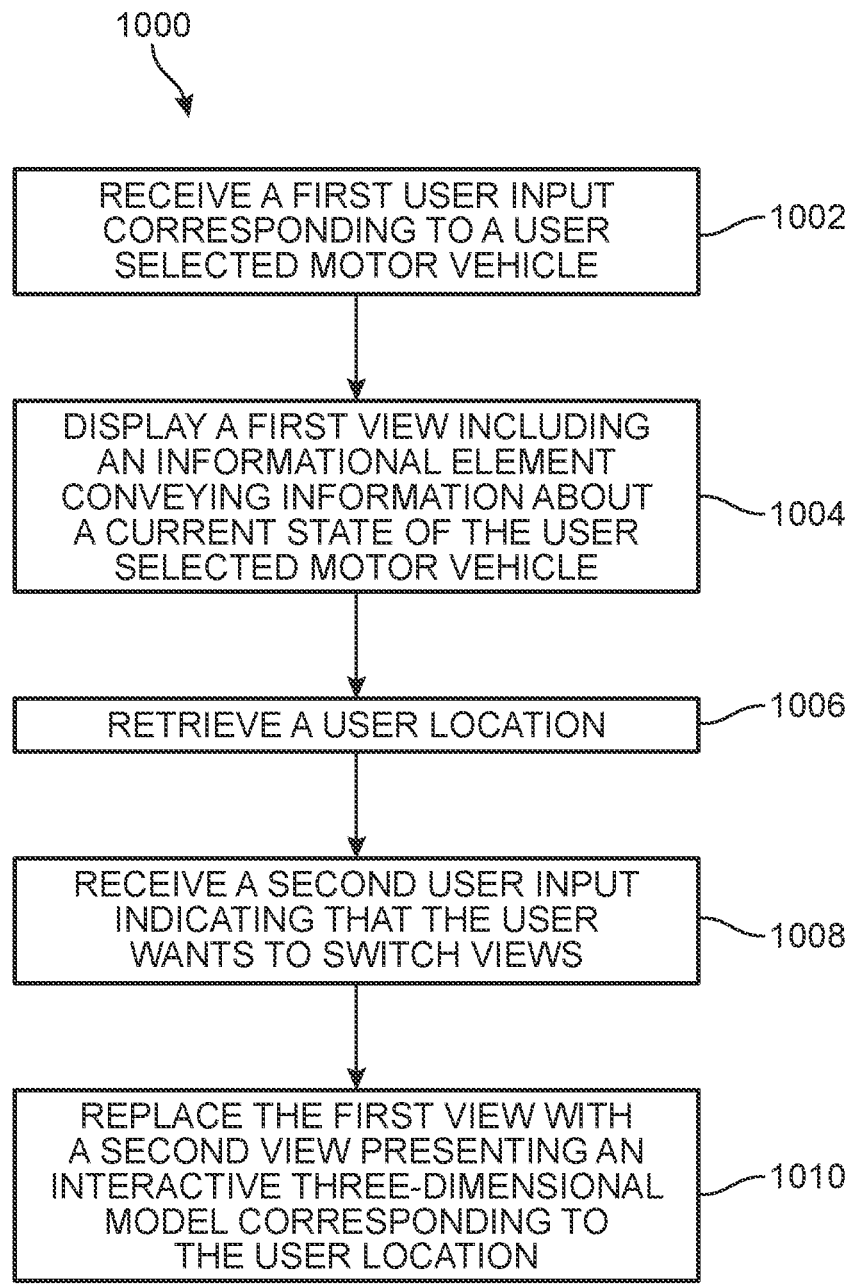
FIGS. 10-11 are flow charts showing methods for managing contextual views within an application interface, according to an embodiment.

FIG. 10 is a schematic view illustrating an embodiment of a method 1000 for managing contextual views within an application. Starting in step 1002, an application may receive a first user input corresponding to the user selected vehicle. Next, in step 1004, the application may display a first view including an information element that presents information about a current state of the user selected motor vehicle. In step 1006, the application can retrieve a user location, for example, by querying a user's mobile device.

In step 1008, the application may receive a second user input indicating that the user wants to switch views. In some cases, the input could be a touch-based gesture. In other cases, the input could be selecting a button to begin a particular function or process, such as navigation.

In response to the second user input, the application may replace the first view with a second view. The second view may present an interactive three-dimensional model that corresponds to the user's location. For example, the three-dimensional model could be a model of a particular area within a city.

Figure 11:
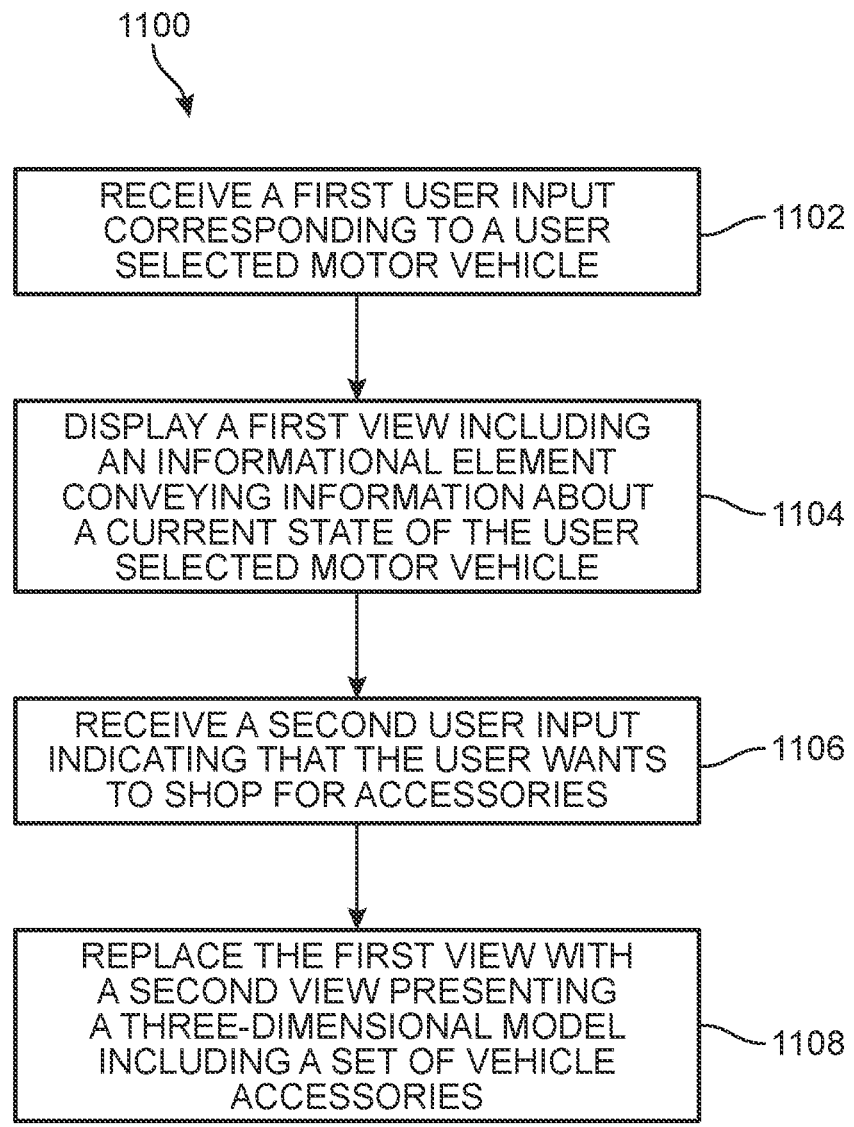

FIG. 11 is a schematic view illustrating another embodiment of a method 1100 for managing contextual views within an application. Starting in step 1102, an application may receive a first user input corresponding to the user selected vehicle. Next, in step 1104, the application may display a first view including an information element that presents information about a current state of the user selected motor vehicle.

In step 1106, the application may receive a second user input indicating that the user wants to shop for accessories. In some cases, the input could be a touch-based gesture. In other cases, the input could be selecting a button to begin shopping via an immersive view.

In response to the second user input, the application may replace the first view with a second view. The second view may present an interactive three-dimensional model. In addition, the second view may include graphical elements that represent a set of optional vehicle accessories. More specifically, the set of optional vehicle accessories are customized for the type of user selected vehicle. For example, if a car is selected, the accessories shown may include a roof rack. Whereas if a motorcycle is selected, the accessories would not include a roof rack, but might include a motorcycle helmet.

The following includes definitions of selected terms employed herein. The definitions include various examples and/or forms of components that fall within the scope of a term and that can be used for implementation. The examples are not intended to be limiting. Aspects of the present disclosure can be implemented using hardware, software, or a combination thereof and can be implemented in one or more computer systems or other processing systems. In one example variation, aspects described herein can be directed toward one or more computer systems capable of carrying out the functionality described herein. An example of such a computer system includes one or more processors. A "processor", as used herein, generally processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

The apparatus and methods described herein and illustrated in the accompanying drawings by various blocks, modules, components, circuits, steps, processes, algorithms, etc. (collectively referred to as "elements") can be implemented using electronic hardware, computer software, or any combination thereof. Whether such elements are implemented as hardware or software depends upon the particular application and design constraints imposed on the overall system. By way of example, an element, or any portion of an element, or any combination of elements can be implemented with a "processing system" that includes one or more processors. One or more processors in the processing system can execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described can be implemented in hardware, software, firmware, or any combination thereof. If implemented in software, the functions can be stored on or encoded as one or more instructions or code on a computer-readable medium. Computer-readable media includes computer storage media. Storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

The processor can be connected to a communication infrastructure (e.g., a communications bus, cross-over bar, or network). Various software aspects are described in terms of this example computer system. After reading this description, it will become apparent to a person skilled in the relevant art(s) how to implement aspects described herein using other computer systems and/or architectures.

Computer system can include a display interface that forwards graphics, text, and other data from the communication infrastructure (or from a frame buffer) for display on a display unit. Display unit can include display, in one example. Computer system also includes a main memory, e.g., random access memory (RAM), and can also include a secondary memory. The secondary memory can include, e.g., a hard disk drive and/or a removable storage drive, representing a floppy disk drive, a magnetic tape drive, an optical disk drive, etc. The removable storage drive reads from and/or writes to a removable storage unit in a well-known manner. Removable storage unit, represents a floppy disk, magnetic tape, optical disk, etc., which is read by and written to removable storage drive. As will be appreciated, the removable storage unit includes a computer usable storage medium having stored therein computer software and/or data.

Computer system can also include a communications interface. Communications interface allows software and data to be transferred between computer system and external devices. Examples of communications interface can include a modem, a network interface (such as an Ethernet card), a communications port, a Personal Computer Memory Card International Association (PCMCIA) slot and card, etc. Software and data transferred via communications interface are in the form of signals, which can be electronic, electromagnetic, optical or other signals capable of being received by communications interface. These signals are provided to communications interface via a communications path (e.g., channel). This path carries signals and can be implemented using wire or cable, fiber optics, a telephone line, a cellular link, a radio frequency (RF) link and/or other communications channels. The terms "computer program medium" and "computer usable medium" are used to refer generally to media such as a removable storage drive, a hard disk installed in a hard disk drive, and/or signals. These computer program products provide software to the computer system. Aspects described herein can be directed to such computer program products. Communications device can include communications interface.

Computer programs (also referred to as computer control logic) are stored in main memory and/or secondary memory. Computer programs can also be received via communications interface. Such computer programs, when executed, enable the computer system to perform various features in accordance with aspects described herein. In particular, the computer programs, when executed, enable the processor to perform such features. Accordingly, such computer programs represent controllers of the computer system.

In variations where aspects described herein are implemented using software, the software can be stored in a computer program product and loaded into computer system using removable storage drive, hard disk drive, or communications interface. The control logic (software), when executed by the processor, causes the processor to perform the functions in accordance with aspects described herein. In another variation, aspects are implemented primarily in hardware using, e.g., hardware components, such as application specific integrated circuits (ASICs). Implementation of the hardware state machine so as to perform the functions described herein will be apparent to persons skilled in the relevant art(s). In yet another example variation, aspects described herein are implemented using a combination of both hardware and software.

The foregoing disclosure of the preferred embodiments has been presented for purposes of illustration and description. It is not intended to be exhaustive or to limit the embodiments to the precise forms disclosed. Many variations and modifications of the embodiments described herein will be apparent to one of ordinary skill in the art in light of the above disclosure.

While various embodiments have been described, the description is intended to be exemplary, rather than limiting, and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

Further, in describing representative embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the present embodiments.

The invention claimed is:

1. A method of modifying views presented within a user interface of an application in response to user behavior, the method comprising:
   receiving, via the application, a first user input corresponding to a user selected vehicle;
   displaying a first view, the first view comprising a selected vehicle element comprising an image of the user selected vehicle, a background graphical element, and a vehicle information element disposed in front of the background graphical element, wherein the vehicle information element provides information about a current state of the user selected vehicle;
   wherein the background graphical element comprises a first representation of an outdoor environment associated with the user selected vehicle;
   automatically retrieving a user location;
   receiving, via the application, a second user input;
   wherein in response to receiving the second user input, the method further comprises automatically generating and displaying a transition effect that zooms past the selected vehicle element and the vehicle information element, and passes through the background graphical element to arrive at a second view;
   wherein the second view presents an interactive three-dimensional model corresponding to the user location; and
   wherein the second view comprises a second representation of the outdoor environment associated with the user selected vehicle, and wherein the second representation of the outdoor environment is more detailed than the first representation of the outdoor environment.

2. The method according to claim 1, wherein the first representation of the outdoor environment is two-dimensional and wherein the second representation of the outdoor environment is three-dimensional.

3. The method according to claim 1, wherein the background graphical element is a static image.

4. The method according to claim 1, wherein the interactive three-dimensional model is a 3D map.

5. The method according to claim 1, wherein the second user input is a touch-based gesture.

6. The method according to claim 1, wherein the second user input includes entering a destination for a navigation system.

7. The method according to claim 1, wherein the method further includes steps of:
   identifying a nearby motor vehicle that is similar to the user selected vehicle; and
   generating an avatar for the nearby motor vehicle within the interactive three-dimensional model.

8. The method according to claim 1, wherein the user selected vehicle is a car.

9. The method according to claim 1, wherein the method further includes steps of:
   receiving a third user input; and
   automatically replacing the second view with the first view in response to receiving the third user input.

10. A method of modifying views presented in a user interface of an application in response to user behavior, the method comprising:
    receiving, via the application, a first user input corresponding to a user selected vehicle;
    displaying a first view, the first view comprising a selected vehicle element comprising an image of the user selected vehicle, a background graphical element, and a vehicle information element disposed in front of the background graphical element, wherein the vehicle information element provides information about a current state of the user selected vehicle;
    wherein the background graphical element comprises a first representation of an outdoor environment associated with the user selected vehicle;
    receiving, via the application, a second user input;
    wherein in response to receiving the second user input, the method further comprises automatically generating and displaying a transition effect that zooms past the selected vehicle element and the vehicle information element, and passes through the background graphical element to arrive at a second view;
    wherein the second view presents:
    a three-dimensional model of an environment that is more detailed than the first representation of the outdoor environment;
    a graphical image representing the user selected vehicle; and
    a set of selectable vehicle accessories disposed within the three-dimensional model.

11. The method according to claim 10, wherein the first representation of the outdoor environment is two-dimensional.

12. The method according to claim 10, wherein the method further includes a step of receiving a user selected accessory and displaying the user selected accessory in an appropriate location on the graphical image of the user selected vehicle.

13. The method according to claim 10, wherein the three-dimensional model is a model of a vehicle dealership.

14. A system for modifying views presented within a user interface of an application in response to user behavior, the system comprising a processor and a non-transitory machine-readable media including instructions which, when executed by the processor, cause the processor to:
    receive, via the application, a first user input corresponding to a user selected vehicle;
    display a first view, the first view comprising a selected vehicle element comprising an image of the user selected vehicle, a background graphical element, and a vehicle information element disposed in front of the background graphical element, wherein the vehicle information element provides information about a current state of the user selected vehicle;

wherein the background graphical element comprises a first representation of an outdoor environment associated with the user selected vehicle;

automatically retrieve a user location;

receive, via the application, a second user input;

automatically generate and display, in response to receiving the second user input, a transition effect that zooms past the selected vehicle element and the vehicle information element, and passes through the background image to arrive at a second view;

wherein the second view presents an interactive three-dimensional model corresponding to the user location; and wherein the second view comprises a second representation of the outdoor environment associated with the user selected vehicle, and wherein the second representation of the outdoor environment is more detailed than the first representation of the outdoor environment.

15. The system according to claim 14, wherein the first representation of the outdoor environment is two-dimensional and wherein the second representation of the outdoor environment is three-dimensional.

16. The system according to claim 14, wherein the background graphical element is a static image.

17. The system according to claim 14, wherein the interactive three-dimensional model is a 3D map.

18. The system according to claim 14, wherein the second user input is a touch-based gesture.

19. The system according to claim 14, wherein the instructions further cause the processor to:

identify a nearby motor vehicle that is similar to the user selected vehicle; and generate an avatar for the nearby motor vehicle within the interactive three-dimensional model.

20. The system according to claim 14, wherein the instructions further cause the processor to:

receive a third user input; and automatically replace the second view with the first view in response to the received third user input.

* * * * *